(12) United States Patent
Raghavan et al.

(10) Patent No.: US 11,728,950 B2
(45) Date of Patent: Aug. 15, 2023

(54) QUASI CO-LOCATION REPORTING IN MILLIMETER WAVE FREQUENCY REGIMES

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 17/304,087

(22) Filed: Jun. 14, 2021

(65) Prior Publication Data

US 2021/0391966 A1 Dec. 16, 2021

Related U.S. Application Data

(60) Provisional application No. 63/039,831, filed on Jun. 16, 2020.

(51) Int. Cl.
*H04L 5/00* (2006.01)
(52) U.S. Cl.
CPC .......... *H04L 5/0053* (2013.01); *H04L 5/0048* (2013.01)
(58) Field of Classification Search
CPC ............................ H04L 5/0053; H04L 5/0048
See application file for complete search history.

(56) References Cited

U.S. PATENT DOCUMENTS

| | | | | |
|---|---|---|---|---|
| 2017/0026938 A1* | 1/2017 | Onggosanusi | ........ | H04L 5/0053 |
| 2018/0331727 A1* | 11/2018 | John Wilson | ......... | H04L 5/0053 |
| 2019/0334603 A1* | 10/2019 | Venugopal | ........ | H04W 72/0413 |
| 2022/0286254 A1* | 9/2022 | Cha | ...................... | H04W 24/10 |

FOREIGN PATENT DOCUMENTS

| | | | | |
|---|---|---|---|---|
| EP | 3657839 A1 * | 5/2020 | ........... | H04B 7/0626 |
| EP | 3657839 A1 | 5/2020 | | |
| GB | 2565332 A | 2/2019 | | |

OTHER PUBLICATIONS

International Search Report and Written Opinion—PCT/US2021/070712—ISA/EPO—dated Sep. 10, 2021.

* cited by examiner

*Primary Examiner* — Duc C Ho
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment may receive a quasi co-location (QCL) reporting configuration that indicates a number of QCL relationships to report; and transmit a QCL report based at least in part on the QCL reporting configuration, wherein the QCL report indicates a QCL relationship between a single reference signal and a plurality of identified bandwidth parts (BWPs), or a plurality of QCL relationships between a plurality of reference signals and the plurality of identified BWPs, wherein the plurality of identified BWPs are part of a millimeter wave frequency regime. Numerous other aspects are provided.

30 Claims, 6 Drawing Sheets

QUASI CO-LOCATION REPORTING IN MILLIMETER WAVE FREQUENCY REGIMES

CROSS-REFERENCE TO RELATED APPLICATION

This Patent Application claims priority to U.S. Provisional Patent Application Ser. No. 63/039,831, filed on Jun. 16, 2020, entitled "QUASI CO-LOCATION REPORTING IN MILLIMETER WAVE FREQUENCY REGIMES," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for quasi co-location reporting in millimeter wave frequency regimes.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a quasi co-location (QCL) reporting configuration that indicates a number of QCL relationships to report; and transmitting a QCL report based at least in part on the QCL reporting configuration, wherein the QCL report indicates a QCL relationship between a single reference signal and a plurality of identified bandwidth parts (BWPs), or a plurality of QCL relationships between a plurality of reference signals and the plurality of identified BWPs, wherein the plurality of identified BWPs are part of a millimeter wave frequency regime.

In some aspects, a method of wireless communication performed by a base station includes transmitting a QCL reporting configuration that indicates a number of QCL relationships to report; and receiving a QCL report based at least in part on the QCL reporting configuration, wherein the QCL report indicates a QCL relationship between a single reference signal and a plurality of identified BWPs, or a plurality of QCL relationships between a plurality of reference signals and the plurality of identified BWPs, wherein the plurality of identified BWPs are part of a millimeter wave frequency regime.

In some aspects, a UE for wireless communication includes a memory, a transceiver, and one or more processors coupled to the memory and to the transceiver, the one or more processors configured to: receive, via the transceiver, a QCL reporting configuration that indicates a number of QCL relationships to report; and transmit, via the transceiver, a QCL report based at least in part on the QCL reporting configuration, wherein the QCL report indicates a QCL relationship between a single reference signal and a plurality of identified BWPs, or a plurality of QCL relationships between a plurality of reference signals and the plurality of identified BWPs, wherein the plurality of identified BWPs are part of a millimeter wave frequency regime.

In some aspects, a base station for wireless communication includes a memory, a transceiver, and one or more processors coupled to the memory and to the transceiver, the one or more processors configured to: transmit, via the transceiver, a QCL reporting configuration that indicates a number of QCL relationships to report; and receive, via the transceiver, a QCL report based at least in part on the QCL reporting configuration, wherein the QCL report indicates a QCL relationship between a single reference signal and a plurality of identified BWPs, or a plurality of QCL relationships between a plurality of reference signals and the plurality of identified BWPs, wherein the plurality of identified BWPs are part of a millimeter wave frequency regime.

In some aspects, a non-transitory computer-readable medium storing one or more instructions for wireless communication includes one or more instructions that, when executed by one or more processors of a UE, cause the one or more processors to: receive a QCL reporting configuration that indicates a number of QCL relationships to report; and transmit a QCL report based at least in part on the QCL reporting configuration, wherein the QCL report indicates a QCL relationship between a single reference signal and a plurality of identified BWPs, or a plurality of QCL relationships between a plurality of reference signals and the plurality of identified BWPs, wherein the plurality of identified BWPs are part of a millimeter wave frequency regime.

In some aspects, a non-transitory computer-readable medium storing one or more instructions for wireless communication includes one or more instructions that, when executed by one or more processors of a base station, cause the one or more processors to: transmit a QCL reporting configuration that indicates a number of QCL relationships to report; and receive a QCL report based at least in part on the QCL reporting configuration, wherein the QCL report indicates a QCL relationship between a single reference signal and a plurality of identified BWPs, or a plurality of QCL relationships between a plurality of reference signals and the plurality of identified BWPs, wherein the plurality of identified BWPs are part of a millimeter wave frequency regime.

In some aspects, an apparatus for wireless communication includes means for receiving a QCL reporting configuration that indicates a number of QCL relationships to report; and means for transmitting a QCL report based at least in part on the QCL reporting configuration, wherein the QCL report indicates a QCL relationship between a single reference signal and a plurality of identified BWPs, or a plurality of QCL relationships between a plurality of reference signals and the plurality of identified BWPs, wherein the plurality of identified BWPs are part of a millimeter wave frequency regime.

In some aspects, an apparatus for wireless communication includes means for transmitting a QCL reporting configuration that indicates a number of QCL relationships to report; and means for receiving a QCL report based at least in part on the QCL reporting configuration, wherein the QCL report indicates a QCL relationship between a single reference signal and a plurality of identified BWPs, or a plurality of QCL relationships between a plurality of reference signals and the plurality of identified BWPs, wherein the plurality of identified BWPs are part of a millimeter wave frequency regime.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
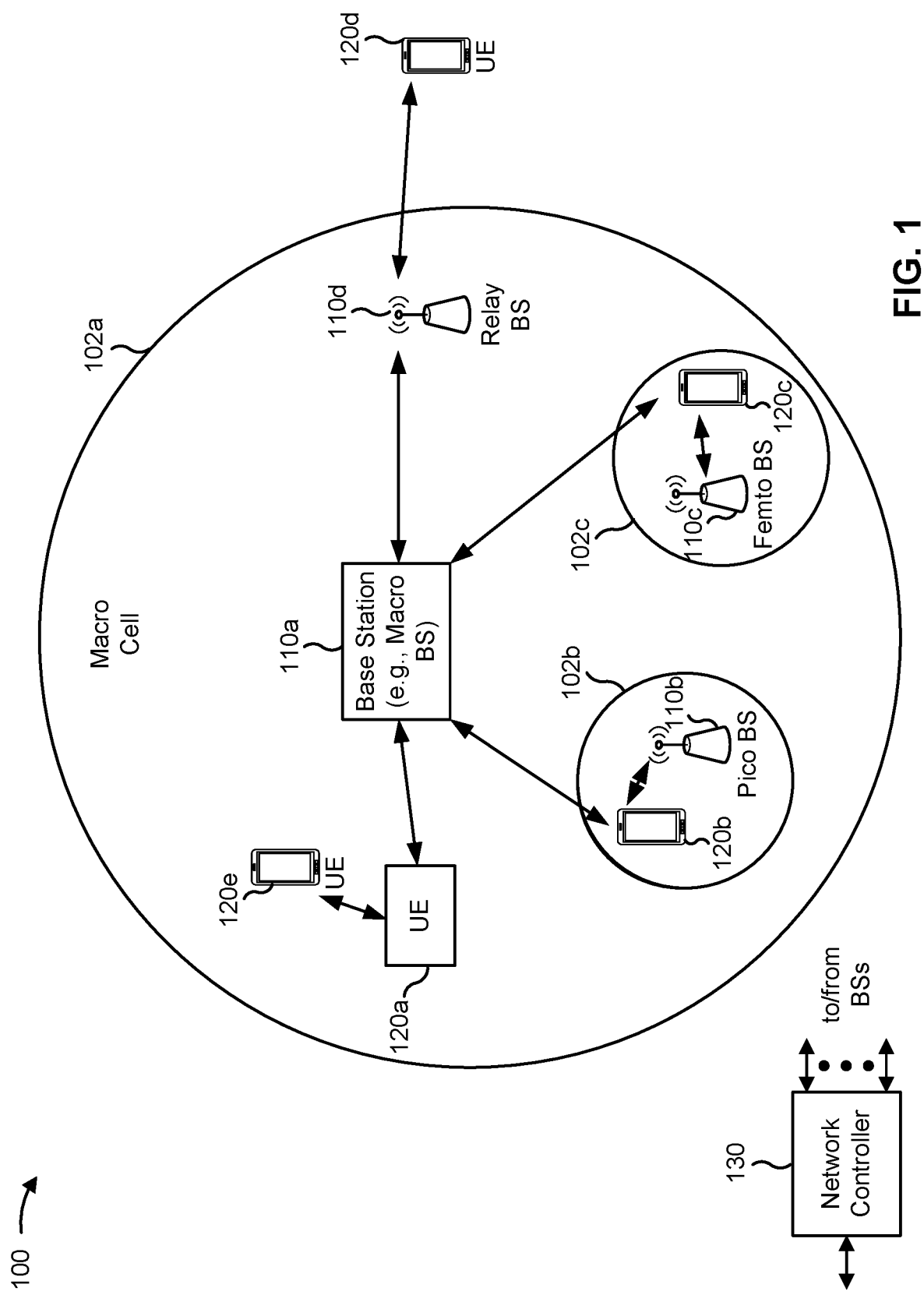
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
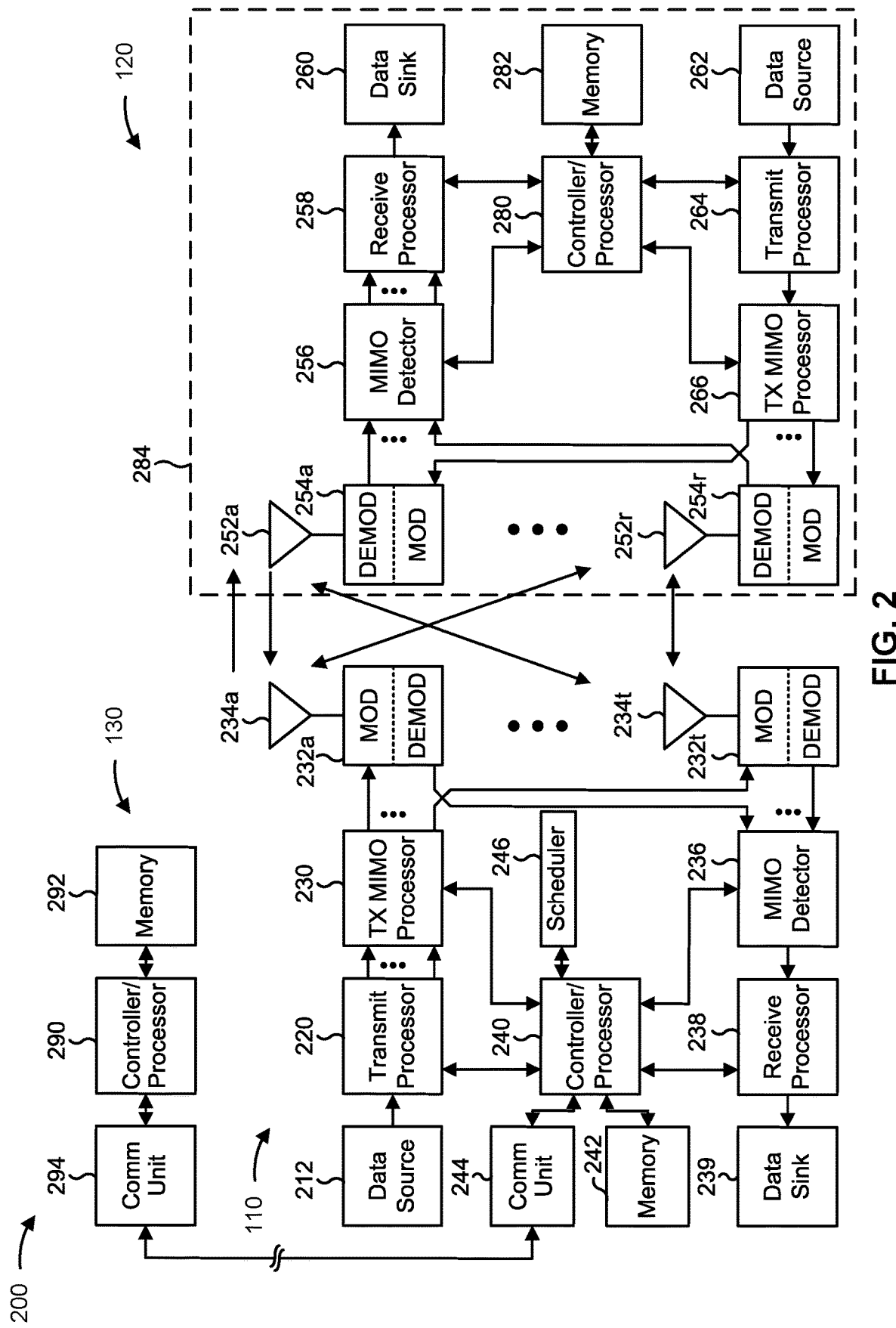
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-6). For example, where a processor and memory of the UE are configured to transmit or to receive, it is understood that the processor and the memory may be configured to transmit or receive via the transceiver.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-6). For example, where a processor and memory of the BS are configured to transmit or to receive, it is understood that the processor and the memory may be configured to transmit or receive via the transceiver.

Controller/processor 240 of base station 110, controller/processor 280 of UE 120, and/or any other component(s) of FIG. 2 may perform one or more techniques associated with quasi co-location (QCL) reporting in millimeter wave frequency regimes, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, UE 120 may include means for receiving a QCL reporting configuration that indicates a number of QCL relationships to report (e.g., using antenna 252, DEMOD 254, MIMO detector 256, receive processor 258, controller/processor 280, memory 282, and/or the like), means for transmitting a QCL report based at least in part on the QCL reporting configuration, wherein the QCL report indicates a QCL relationship between a single reference signal and a plurality of identified bandwidth parts (BWPs), or a plurality of QCL relationships between a plurality of reference signals and the plurality of identified BWPs, wherein the plurality of identified BWPs are part of a millimeter wave frequency regime (e.g., using controller/processor 280, transmit processor 264, TX MIMO processor 266, MOD 254, antenna 252, memory 282, and/or the like), and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting a QCL reporting configuration that indicates a number of QCL relationships to report (e.g., using controller/processor 240, transmit processor 220, TX MIMO processor 230, MOD 232, antenna 234, memory 242, and/or the like), means for receiving a QCL report based at least in part on the QCL reporting configuration, wherein the QCL report indicates a QCL relationship between a single reference signal and a plurality of identified BWPs, or a plurality of QCL relationships between a plurality of reference signals and the plurality of identified BWPs, wherein the plurality of identified BWPs are part of a millimeter wave frequency regime (e.g., using antenna 234, DEMOD 232, MIMO detector 236, receive processor 238, controller/processor 240, memory 242, and/or the like), and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Increases in carrier frequencies may enable the use of larger antenna arrays and bandwidths by UEs. Additionally, interest in millimeter wave frequency regimes is increasing, as these bandwidths can accommodate larger channel bandwidths than non-millimeter wave bandwidths. In millimeter wave frequency regimes, beam weights designed for a certain BWP may suffer array gain deterioration with a different BWP within the same component carrier. In NR, QCL may be used to characterize relationships between antennas and corresponding signaling beams, which may facilitate establishing beam characteristics for a channel based on characteristics of another channel. However, typically a configuration may include only one QCL mapping for all BWPs in a bandwidth. As a result, beam characteristics that are established based on a QCL mapping corresponding to all of the configured BWPs may be inappropriate and cause signal and/or array gain degradation.

According to various aspects of techniques and apparatuses described herein, QCL reporting may be used to indicate at least one QCL relationship between at least one reference signal and at least one identified BWP. The granularity of mapping a QCL relationship between a reference signal and a specific, identified BWP may lead to more appropriate beam characteristic selection and, accordingly, higher signal and/or array gain quality. In some aspects, a QCL relationship between a single reference signal and multiple identified BWPs may be reported. In this way, a high degree of granularity may be achieved while reducing network overhead. In some aspects, a UE may indicate a QCL relationship along with array gain deterioration, effective isotropic radiated power (EIRP) deterioration, and/or the like. In some aspects, the UE may indicate, for each QCL relationship, the frequency range or frequency ranges for which the QCL relationship is applicable. In this way, a base station may be able to determine whether additional QCL mappings should be used.

Figure 3:
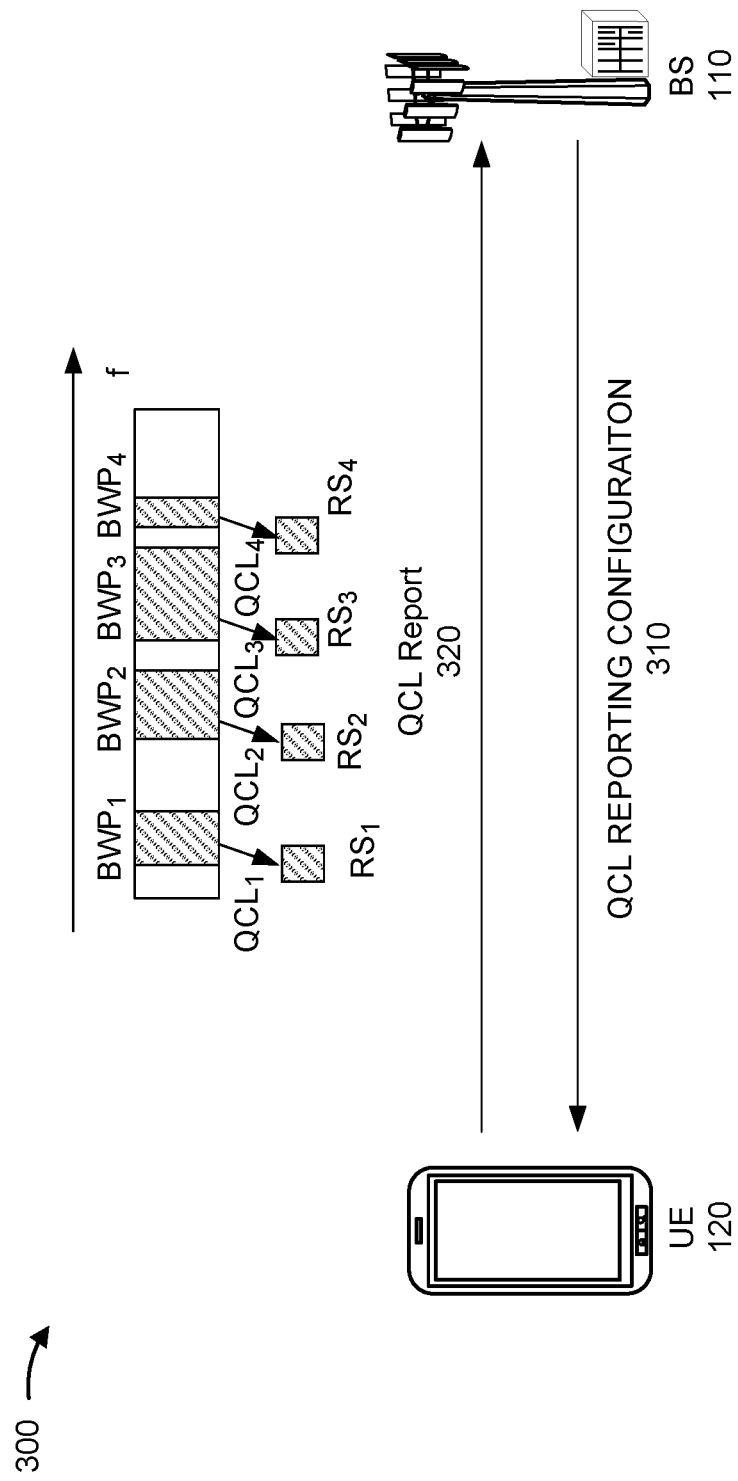
FIGS. 3-4 are diagrams illustrating examples associated with quasi co-location (QCL) reporting in millimeter wave frequency regimes, in accordance with the present disclosure.

FIG. 3 is a diagram illustrating an example 300 associated with QCL reporting in millimeter wave frequency regimes, in accordance with the present disclosure. As shown, a UE 120 and a BS 110 may be in communication with one another.

As shown by reference number 310, the BS 110 may transmit, and the UE 120 may receive, a QCL reporting configuration that indicates a number of QCL relationships to report. As shown by reference number 320, the UE 120 may transmit, and the BS 110 may receive, a QCL report. The QCL report may be based at least in part on the QCL reporting configuration. In some aspects, the QCL report may indicate at least one QCL relationship between at least one reference signal and at least one identified BWP. In some aspects, the at least one identified BWP may include a part of a millimeter wave frequency regime. In some aspects, the millimeter wave frequency regime may include frequencies greater than or equal to 24.25 GHz.

In some aspects, the at least one QCL relationship may include a QCL relationship between a single reference signal and a plurality of identified BWPs. In some aspects, the at least one QCL relationship may include multiple QCL relationships between multiple reference signals and multiple BWPs. In some aspects, one or more of the reference signals may include a channel state information reference signal (CSI-RS), a sounding reference signal (SRS), and/or the like. In some aspects, as explained further below in connection with FIG. 4, the QCL reporting configuration may indicate the at least one BWP, and the QCL report may indicate an array gain deterioration over at least a portion of the millimeter wave frequency regime and associated with the at least one QCL relationship, an EIRP deterioration over at least a portion of the millimeter wave frequency regime and associated with the at least one QCL relationship, and/or the like.

As indicated above, FIG. 3 is provided as an example. Other examples may differ from what is described with regard to FIG. 3.

Figure 4:
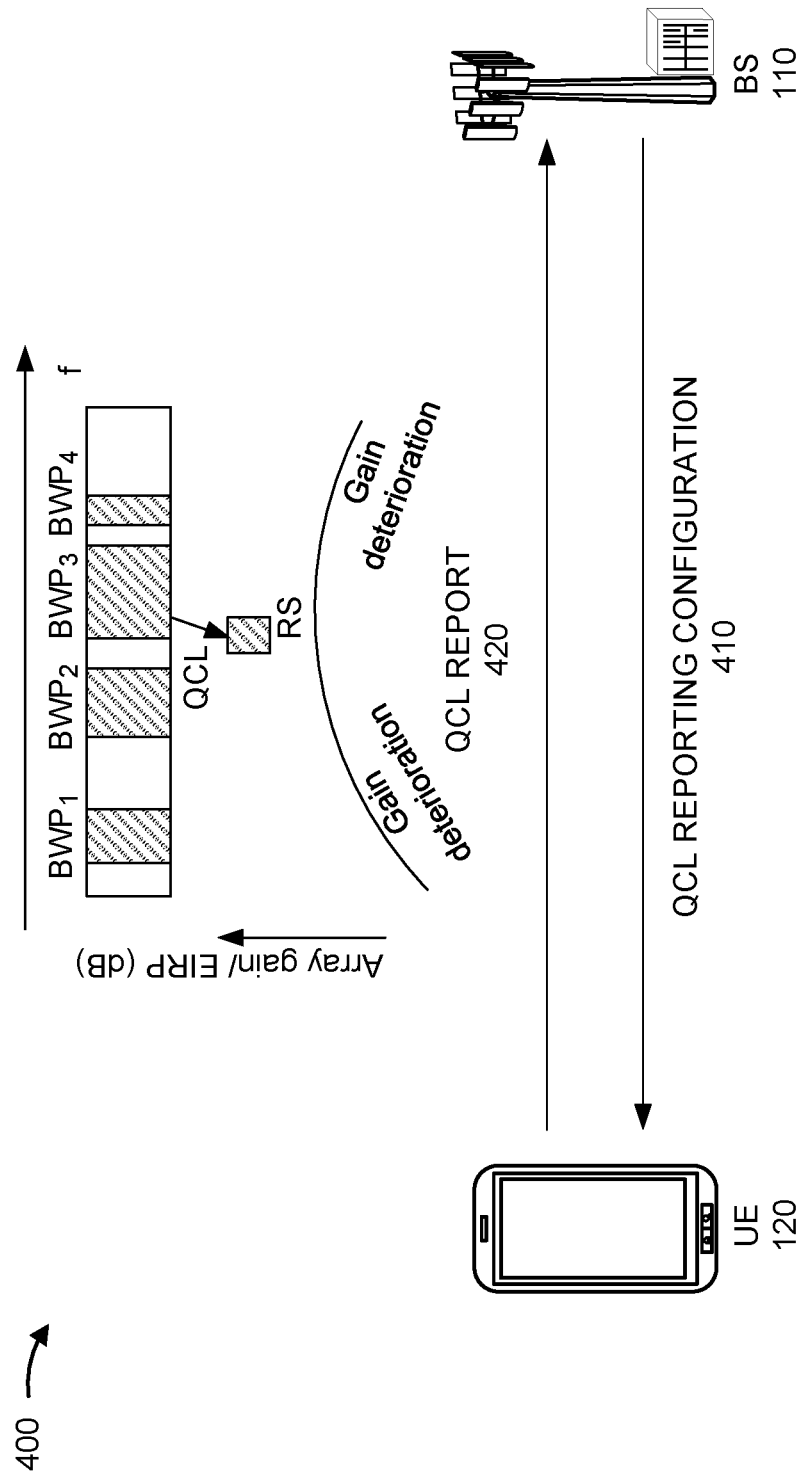

FIG. 4 is a diagram illustrating an example 400 associated with QCL reporting in millimeter wave frequency regimes, in accordance with the present disclosure. As shown, a UE 120 and a BS 110 may communicate with one another.

As shown by reference number 410, the BS 110 may transmit, and the UE 120 may receive, a QCL reporting configuration that indicates a number of QCL relationships to report. As shown by reference number 420, the UE 120 may transmit, and the BS 110 may receive, a QCL report. The QCL report may be based at least in part on the QCL reporting configuration. In some aspects, the QCL report may indicate at least one QCL relationship between at least one reference signal and at least one identified BWP. In some aspects, the at least one identified BWP may include a part of a millimeter wave frequency regime. In some aspects, the millimeter wave frequency regime may include frequencies greater than or equal to 24.25 GHz.

In some aspects, the at least one QCL relationship may include a QCL relationship between a single reference signal and a plurality of identified BWPs. In some aspects, the at least one QCL relationship may include multiple QCL relationships between multiple reference signals and multiple BWPs. In some aspects, one or more of the reference signals may include a CSI-RS, an SRS, and/or the like.

In some aspects, as shown in FIG. 4, the QCL reporting configuration may indicate the at least one BWP, and the QCL report may indicate an array gain deterioration over at least a portion of the millimeter wave frequency regime that is associated with the at least one QCL relationship, an EIRP deterioration over at least a portion of the millimeter wave frequency regime that is associated with the at least one QCL relationship, and/or the like. In some aspects, the array gain deterioration may include a worst-case array gain deterioration, a mean array gain deterioration, a measure of the array gain deterioration, and/or the like.

In some aspects, the at least a portion of the millimeter wave frequency regime may include one or more configured BWPs. In some aspects, the BS 110 may transmit, and the UE 120 may receive, an indication of at least one additional reference signal. The at least one additional reference signal may be based at least in part on a determination that the array gain deterioration satisfies a gain deterioration threshold, a determination that the EIRP deterioration satisfies an EIRP deterioration threshold, and/or the like. In this way, a BS 110 may be able to determine when additional QCL relationships should be implemented.

As indicated above, FIG. 4 is provided as an example. Other examples may differ from what is described with regard to FIG. 4.

Figure 5:
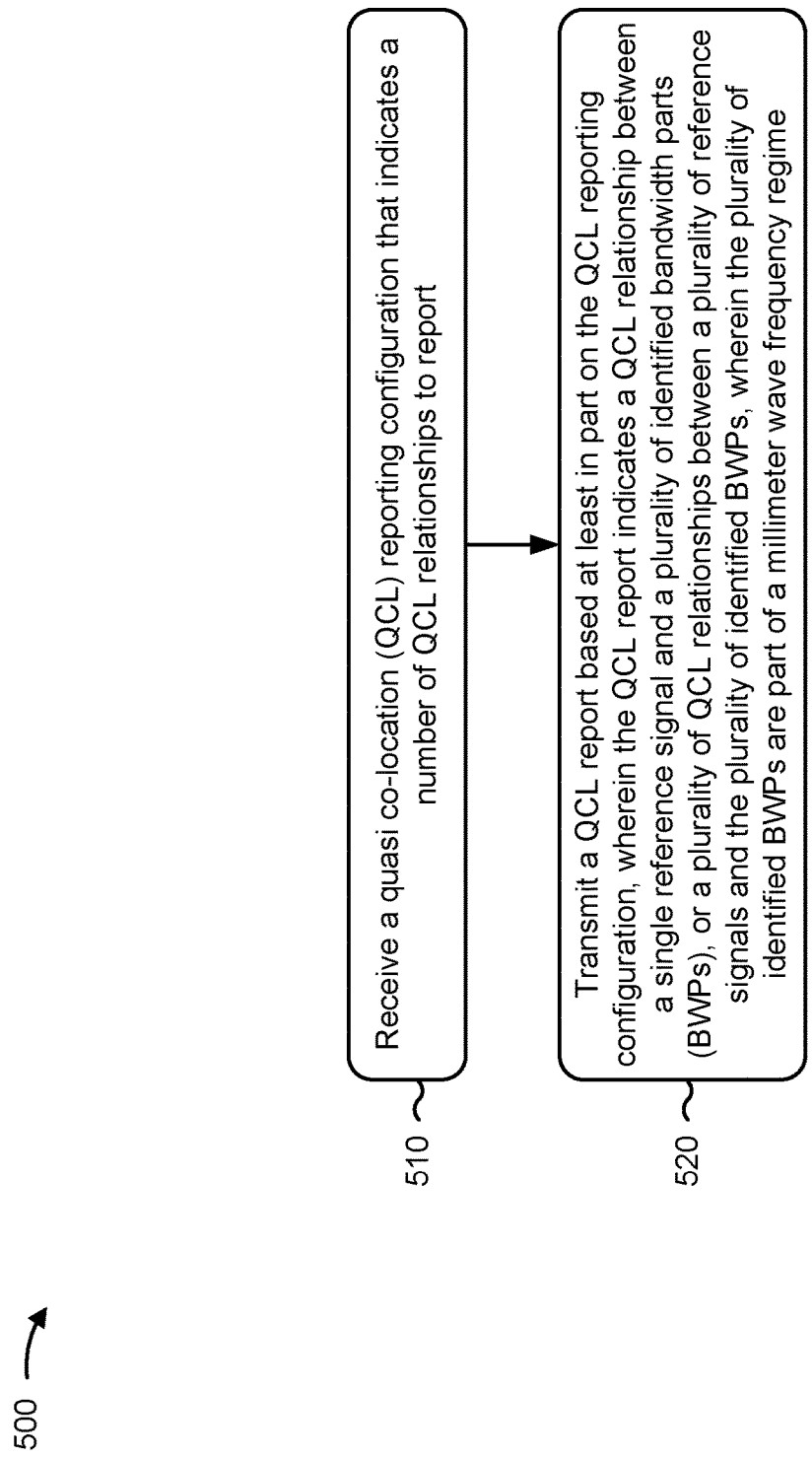
FIGS. 5-6 are diagrams illustrating example processes associated with QCL reporting in millimeter wave frequency regimes, in accordance with the present disclosure.

FIG. 5 is a diagram illustrating an example process 500 performed, for example, by a UE, in accordance with the present disclosure. Example process 500 is an example where the UE (e.g., UE 120 and/or the like) performs operations associated with QCL reporting in millimeter wave frequency regimes.

As shown in FIG. 5, in some aspects, process 500 may include receiving a QCL reporting configuration that indicates a number of QCL relationships to report (block 510). For example, the UE (e.g., using receive processor 258, controller/processor 280, memory 282, and/or the like) may receive a QCL reporting configuration that indicates a number of QCL relationships to report, as described above, for example, with reference to FIGS. 3 and/or 4.

As further shown in FIG. 5, in some aspects, process 500 may include transmitting a QCL report based at least in part on the QCL reporting configuration, wherein the QCL report indicates a QCL relationship between a single reference signal and a plurality of identified BWPs, or a plurality of QCL relationships between a plurality of reference signals and the plurality of identified BWPs, wherein the plurality of identified BWPs are part of a millimeter wave frequency regime (block 520). For example, the UE (e.g., using transmit processor 264, controller/processor 280, memory 282, and/or the like) may transmit a QCL report based at least in part on the QCL reporting configuration, as described above, for example, with reference to FIGS. 3 and/or 4. In some aspects, the QCL report indicates a QCL relationship between a single reference signal and a plurality of identified BWPs. In some aspects, the QCL report indicates a plurality of QCL relationships between a plurality of reference signals and a plurality of identified BWPs. In some aspects, the plurality of identified BWPs is a part of a millimeter wave frequency regime.

Process 500 may include additional aspects, such as any single aspect or any combination of aspects described below and/or in connection with one or more other processes described elsewhere herein.

In a first aspect, at least one reference signal of the single reference signal or the plurality of reference signals comprises a CSI-RS or an SRS.

In a second aspect, alone or in combination with the first aspect, the QCL reporting configuration indicates the plurality of identified BWPs.

In a third aspect, alone or in combination with one or more of the first through second aspects, the millimeter wave frequency regime comprises frequencies greater than or equal to 24.25 GHz.

In a fourth aspect, alone or in combination with one or more of the first through third aspects, the QCL report further indicates at least one of a beamforming array gain deterioration associated with an antenna array over at least a portion of the millimeter wave frequency regime that is associated with at least one QCL relationship of the QCL relationship or the plurality of QCL relationships, an EIRP deterioration over at least a portion of the millimeter wave frequency regime that is associated with the at least one QCL relationship, or a combination thereof.

In a fifth aspect, alone or in combination with the fourth aspect, the beamforming array gain deterioration comprises at least one of a worst-case array gain deterioration, a mean array gain deterioration, a different statistical measure of the array gain deterioration over a coverage area of the antenna array, or a combination thereof.

In a sixth aspect, alone or in combination with one or more of the fourth through fifth aspects, the at least a portion of the millimeter wave frequency regime comprises one or more configured BWPs.

In an eighth aspect, alone or in combination with one or more of the fourth through sixth aspects, process 500 includes receiving an indication of at least one additional reference signal based at least in part on at least one of a determination that the beamforming array gain deterioration satisfies a gain deterioration threshold, a determination that the EIRP deterioration satisfies an EIRP deterioration threshold, or a combination thereof.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
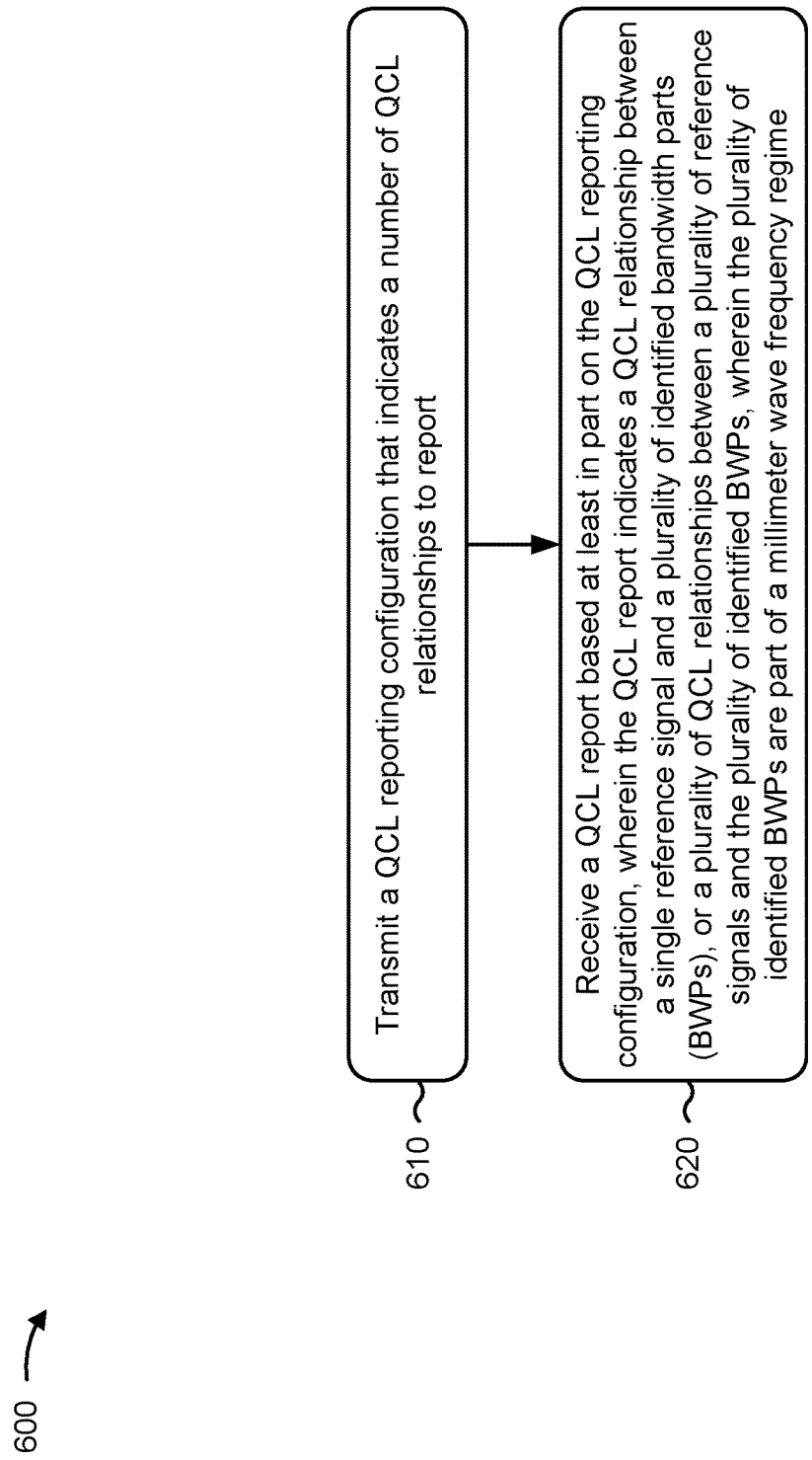

FIG. 6 is a diagram illustrating an example process 600 performed, for example, by a base station, in accordance with the present disclosure. Example process 600 is an example where the base station (e.g., base station 110 and/or the like) performs operations associated with QCL reporting in millimeter wave frequency regimes.

As shown in FIG. 6, in some aspects, process 600 may include transmitting a QCL reporting configuration that indicates a number of QCL relationships to report (block 610). For example, the base station (e.g., using transmit processor 220, controller/processor 240, memory 242, and/or the like) may transmit a QCL reporting configuration that indicates a number of QCL relationships to report, as described above, for example, with reference to FIGS. 3 and/or 4.

As further shown in FIG. 6, in some aspects, process 600 may include receiving a QCL report based at least in part on the QCL reporting configuration, a QCL relationship between a single reference signal and a plurality of identified BWPs, or a plurality of QCL relationships between a plurality of reference signals and the plurality of identified BWPs, wherein the plurality of identified BWPs are part of a millimeter wave frequency regime (block 620). For example, the base station (e.g., using receive processor 238, controller/processor 240, memory 242, and/or the like) may receive a QCL report based at least in part on the QCL reporting configuration, as described above, for example, with reference to FIGS. 3 and/or 4. In some aspects, the QCL report indicates a QCL relationship between a single reference signal and a plurality of identified BWPs, or a plurality of QCL relationships between a plurality of reference signals and the plurality of identified BWPs. In some aspects, the plurality of identified BWPs is a part of a millimeter wave frequency regime.

In a first aspect, at least one reference signal of the single reference signal or the plurality of reference signals comprises a CSI-RS or an SRS.

In a second aspect, alone or in combination with the first aspect, the QCL reporting configuration indicates the plurality of identified BWPs.

In a third aspect, alone or in combination with one or more of the first through second aspects, the millimeter wave frequency regime comprises frequencies greater than or equal to 24.25 GHz.

In a fourth aspect, alone or in combination with the third aspect, the QCL report further indicates at least one of a beamforming array gain deterioration associated with an antenna array over at least a portion of the millimeter wave frequency regime that is associated with at least one QCL relationship of the QCL relationship or the plurality of QCL relationships, an EIRP deterioration over at least a portion of the millimeter wave frequency regime that is associated with the at least one QCL relationship, or a combination thereof.

In a fifth aspect, alone or in combination with the fourth aspect, the beamforming array gain deterioration comprises at least one of a worst-case array gain deterioration, a mean array gain deterioration, a different statistical measure of the array gain deterioration over a coverage area of the antenna array, or a combination thereof.

In a sixth aspect, alone or in combination with one or more of the fourth through fifth aspects, the at least a portion of the millimeter wave frequency regime comprises one or more configured BWPs.

In a seventh aspect, alone or in combination with one or more of the fourth through sixth aspects, process 600 includes transmitting an indication of at least one additional reference signal based at least in part on at least one of a determination that the beamforming array gain deterioration satisfies a gain deterioration threshold, a determination that the EIRP deterioration satisfies an EIRP deterioration threshold, or a combination thereof.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method of wireless communication performed by a user equipment (UE), comprising: receiving a quasi co-location (QCL) reporting configuration that indicates a number of QCL relationships to report; and transmitting a QCL report based at least in part on the QCL reporting configuration, wherein the QCL report indicates: a QCL relationship between a single reference signal and a plurality of identified bandwidth parts (BWPs), or a plurality of QCL relationships between a plurality of reference signals and the plurality of identified BWPs, wherein the plurality of identified BWPs are part of a millimeter wave frequency regime.

Aspect 2: The method of Aspect 1, wherein at least one reference signal of the single reference signal or the plurality of reference signals comprises a channel state information reference signal or a sounding reference signal.

Aspect 3: The method of either of Aspects 1 or 2, wherein the QCL reporting configuration indicates the plurality of identified BWPs.

Aspect 4: The method of any of Aspects 1-3, wherein the millimeter wave frequency regime comprises frequencies greater than or equal to 24.25 gigahertz (GHz).

Aspect 5: The method of any of Aspects 1-4, wherein the QCL report further indicates at least one of: a beamforming array gain deterioration associated with an antenna array over at least a portion of the millimeter wave frequency regime that is associated with at least one QCL relationship of the QCL relationship or the plurality of QCL relationships, an effective isotropic radiated power (EIRP) deterioration over at least a portion of the millimeter wave frequency regime that is associated with the at least one QCL relationship, or a combination thereof.

Aspect 6: The method of Aspect 5, wherein the beamforming array gain deterioration comprises at least one of: a worst-case array gain deterioration, a mean array gain deterioration, a different statistical measure of the array gain deterioration over a coverage area of the antenna array, or a combination thereof.

Aspect 7: The method of either of Aspects 5 or 6, wherein the at least a portion of the millimeter wave frequency regime comprises one or more configured BWPs.

Aspect 8: The method of any of Aspects 5-7, further comprising receiving an indication of at least one additional reference signal based at least in part on at least one of: a determination that the beamforming array gain deterioration satisfies a gain deterioration threshold, a determination that the EIRP deterioration satisfies an EIRP deterioration threshold, or a combination thereof.

Aspect 9: A method of wireless communication performed by a base station, comprising: transmitting a quasi co-location (QCL) reporting configuration that indicates a number of QCL relationships to report; and receiving a QCL report based at least in part on the QCL reporting configuration, wherein the QCL report indicates: a QCL relationship between a single reference signal and a plurality of identified bandwidth parts (BWPs), or a plurality of QCL relationships between a plurality of reference signals and the plurality of identified BWPs, wherein the plurality of identified BWPs are part of a millimeter wave frequency regime.

Aspect 10: The method of Aspect 9, wherein at least one reference signal of the single reference signal or the plurality of reference signals comprises a channel state information reference signal or a sounding reference signal.

Aspect 11: The method of either of Aspects 9 or 10, wherein the QCL reporting configuration indicates the plurality of identified BWPs.

Aspect 12: The method of any of Aspects 9-11, wherein the millimeter wave frequency regime comprises frequencies greater than or equal to 24.25 gigahertz (GHz).

Aspect 13: The method of Aspect 12, wherein the QCL report further indicates at least one of: a beamforming array gain deterioration associated with an antenna array over at least a portion of the millimeter wave frequency regime that is associated with at least one QCL relationship of the QCL relationship or the plurality of QCL relationships, an effective isotropic radiated power (EIRP) deterioration over at least a portion of the millimeter wave frequency regime that is associated with the at least one QCL relationship, or a combination thereof.

Aspect 14: The method of Aspect 13, wherein the array gain deterioration comprises at least one of: a worst-case array gain deterioration, a mean array gain deterioration, a different statistical measure of the array gain deterioration over a coverage area of the antenna array, or a combination thereof.

Aspect 15: The method of either of Aspects 13 or 14, wherein the at least a portion of the millimeter wave frequency regime comprises one or more configured BWPs.

Aspect 16: The method of any of Aspects 13-15, further comprising transmitting an indication of at least one additional reference signal based at least in part on at least one of: a determination that the beamforming array gain deterioration satisfies a gain deterioration threshold, a determination that the EIRP deterioration satisfies an EIRP deterioration threshold, or a combination thereof.

Aspect 17: An apparatus for wireless communication at a device, comprising a processor; memory coupled with the processor; and instructions stored in the memory and executable by the processor to cause the apparatus to perform the method of one or more of Aspects 1-8.

Aspect 18: A device for wireless communication, comprising a memory and one or more processors coupled to the memory, the one or more processors configured to perform the method of one or more of Aspects 1-8.

Aspect 19: An apparatus for wireless communication, comprising at least one means for performing the method of one or more of Aspects 1-8.

Aspect 20: A non-transitory computer-readable medium storing code for wireless communication, the code comprising instructions executable by a processor to perform the method of one or more of Aspects 1-8.

Aspect 21: A non-transitory computer-readable medium storing a set of instructions for wireless communication, the set of instructions comprising one or more instructions that, when executed by one or more processors of a device, cause the device to perform the method of one or more of Aspects 1-8.

Aspect 22: An apparatus for wireless communication at a device, comprising a processor; memory coupled with the processor; and instructions stored in the memory and executable by the processor to cause the apparatus to perform the method of one or more of Aspects 9-16.

Aspect 23: A device for wireless communication, comprising a memory and one or more processors coupled to the memory, the one or more processors configured to perform the method of one or more of Aspects 9-16.

Aspect 24: An apparatus for wireless communication, comprising at least one means for performing the method of one or more of Aspects 9-16.

Aspect 25: A non-transitory computer-readable medium storing code for wireless communication, the code comprising instructions executable by a processor to perform the method of one or more of Aspects 9-16.

Aspect 26: A non-transitory computer-readable medium storing a set of instructions for wireless communication, the set of instructions comprising one or more instructions that, when executed by one or more processors of a device, cause the device to perform the method of one or more of Aspects 9-16.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    receiving a quasi co-location (QCL) reporting configuration that indicates a number of QCL relationships to report; and
    transmitting a QCL report based at least in part on the QCL reporting configuration, wherein the QCL report indicates:
        a QCL relationship between a single reference signal and a plurality of identified bandwidth parts (BWPs), or
        a plurality of QCL relationships between a plurality of reference signals and the plurality of identified BWPs, wherein the plurality of identified BWPs are part of a millimeter wave frequency regime, and further indicates at least one of:
            a beamforming array gain deterioration associated with an antenna array over at least a portion of the millimeter wave frequency regime that is associated with at least one QCL relationship of the QCL relationship or the plurality of QCL relationships, or
            an effective isotropic radiated power (EIRP) deterioration over at least a portion of the millimeter wave frequency regime that is associated with the at least one QCL relationship.

2. The method of claim 1, wherein at least one reference signal of the single reference signal or the plurality of reference signals comprises a channel state information reference signal or a sounding reference signal.

3. The method of claim 1, wherein the QCL reporting configuration indicates the plurality of identified BWPs.

4. The method of claim 1, wherein the millimeter wave frequency regime comprises frequencies greater than or equal to 24.25 gigahertz (GHz).

5. The method of claim 1, wherein the beamforming array gain deterioration comprises at least one of:
    a worst-case array gain deterioration,
    a mean array gain deterioration,
    a different statistical measure of the worst-case array gain deterioration over a coverage area of the antenna array, or
    a combination thereof.

6. The method of claim 1, wherein the at least a portion of the millimeter wave frequency regime comprises one or more configured BWPs.

7. The method of claim 1, further comprising receiving an indication of at least one additional reference signal based at least in part on at least one of:
- a determination that the beamforming array gain deterioration satisfies a gain deterioration threshold,
- a determination that the EIRP deterioration satisfies an EIRP deterioration threshold, or
- a combination thereof.

8. The method of claim 1, wherein the QCL report further indicates, for each QCL relationship, a frequency range for which each QCL relationship is applicable.

9. A method of wireless communication performed by a base station, comprising:
- transmitting a quasi co-location (QCL) reporting configuration that indicates a number of QCL relationships to report; and
- receiving a QCL report based at least in part on the QCL reporting configuration, wherein the QCL report indicates:
  - a QCL relationship between a single reference signal and a plurality of identified bandwidth parts (BWPs), or
  - a plurality of QCL relationships between a plurality of reference signals and the plurality of identified BWPs, wherein the plurality of identified BWPs are part of a millimeter wave frequency regime, and further indicates at least one of:
    - a beamforming array gain deterioration associated with an antenna array over at least a portion of the millimeter wave frequency regime that is associated with at least one QCL relationship of the QCL relationship or the plurality of QCL relationships, or
    - an effective isotropic radiated power (EIRP) deterioration over at least a portion of the millimeter wave frequency regime that is associated with the at least one QCL relationship.

10. The method of claim 9, wherein at least one reference signal of the single reference signal or the plurality of reference signals comprises a channel state information reference signal or a sounding reference signal.

11. The method of claim 9, wherein the QCL reporting configuration indicates the plurality of identified BWPs.

12. The method of claim 9, wherein the millimeter wave frequency regime comprises frequencies greater than or equal to 24.25 gigahertz (GHz).

13. The method of claim 9, wherein the beamforming array gain deterioration comprises at least one of:
- a worst-case array gain deterioration,
- a mean array gain deterioration,
- a different statistical measure of the worst-case array gain deterioration over a coverage area of the antenna array, or
- a combination thereof.

14. The method of claim 9, wherein the at least a portion of the millimeter wave frequency regime comprises one or more configured BWPs.

15. The method of claim 9, further comprising transmitting an indication of at least one additional reference signal based at least in part on at least one of:
- a determination that the beamforming array gain deterioration satisfies a gain deterioration threshold,
- a determination that the EIRP deterioration satisfies an EIRP deterioration threshold, or
- a combination thereof.

16. The method of claim 9, wherein the QCL report further indicates, for each QCL relationship, a frequency range for which each QCL relationship is applicable.

17. The method of claim 16, further comprising:
- determining, based at least in part on the frequency range for which each QCL relationship is applicable, whether to utilize one or more additional QCL mappings.

18. A user equipment (UE) for wireless communication, comprising:
- a memory;
- a transceiver; and
- one or more processors, coupled to the memory and to the transceiver, configured to:
  - receive, via the transceiver, a quasi co-location (QCL) reporting configuration that indicates a number of QCL relationships to report; and
  - transmit, via the transceiver, a QCL report based at least in part on the QCL reporting configuration, wherein the QCL report indicates:
    - a QCL relationship between a single reference signal and a plurality of identified bandwidth parts (BWPs), or
    - a plurality of QCL relationships between a plurality of reference signals and the plurality of identified BWPs, wherein the plurality of identified BWPs are part of a millimeter wave frequency regime, and further indicates at least one of:
      - a beamforming array gain deterioration associated with an antenna array over at least a portion of the millimeter wave frequency regime that is associated with at least one QCL relationship of the QCL relationship or the plurality of QCL relationships, or
      - an effective isotropic radiated power (EIRP) deterioration over at least a portion of the millimeter wave frequency regime that is associated with the at least one QCL relationship.

19. The UE of claim 18, wherein at least one reference signal of the single reference signal or the plurality of reference signals comprises a channel state information reference signal or a sounding reference signal.

20. The UE of claim 18, wherein the QCL reporting configuration indicates the plurality of identified BWPs.

21. The UE of claim 18, wherein the millimeter wave frequency regime comprises frequencies greater than or equal to 24.25 gigahertz (GHz).

22. The UE of claim 18, wherein the beamforming array gain deterioration comprises at least one of:
- a worst-case array gain deterioration,
- a mean array gain deterioration,
- a different statistical measure of the worst-case array gain deterioration over a coverage area of the antenna array, or
- a combination thereof.

23. The UE of claim 18, wherein the at least a portion of the millimeter wave frequency regime comprises one or more configured BWPs.

24. The UE of claim 18, wherein the one or more processors are further configured to receive, via the transceiver, an indication of at least one additional reference signal based at least in part on at least one of:
- a determination that the beamforming array gain deterioration satisfies a gain deterioration threshold,
- a determination that the EIRP deterioration satisfies an EIRP deterioration threshold, or
- a combination thereof.

25. A base station for wireless communication, comprising:
- a memory;
- a transceiver; and
- one or more processors, coupled to the memory and to the transceiver, configured to:
  - transmit, via the transceiver, a quasi co-location (QCL) reporting configuration that indicates a number of QCL relationships to report; and
  - receive, via the transceiver, a QCL report based at least in part on the QCL reporting configuration, wherein the QCL report indicates:
    - a QCL relationship between a single reference signal and a plurality of identified bandwidth parts (BWPs), or
    - a plurality of QCL relationships between a plurality of reference signals and the plurality of identified BWPs, wherein the plurality of identified BWPs are part of a millimeter wave frequency regime, and further indicates at least one of:
      - a beamforming array gain deterioration associated with an antenna array over at least a portion of the millimeter wave frequency regime that is associated with at least one QCL relationship of the QCL relationship or the plurality of QCL relationships, or
      - an effective isotropic radiated power (EIRP) deterioration over at least a portion of the millimeter wave frequency regime that is associated with the at least one QCL relationship.

26. The base station of claim 25, wherein at least one reference signal of the single reference signal or the plurality of reference signals comprises a channel state information reference signal or a sounding reference signal.

27. The base station of claim 25, wherein the QCL reporting configuration indicates the plurality of identified BWPs.

28. The base station of claim 25, wherein the beamforming array gain deterioration comprises at least one of:
- a worst-case array gain deterioration,
- a mean array gain deterioration,
- a different statistical measure of the worst-case array gain deterioration over a coverage area of the antenna array, or
- a combination thereof.

29. The base station of claim 25, wherein the one or more processors are further configured to transmit, via the transceiver, an indication of at least one additional reference signal based at least in part on at least one of:
- a determination that the beamforming array gain deterioration satisfies a gain deterioration threshold,
- a determination that the EIRP deterioration satisfies an EIRP deterioration threshold, or
- a combination thereof.

30. The base station of claim 25, wherein the at least a portion of the millimeter wave frequency regime comprises one or more configured BWPs.

* * * * *